United States Patent
Zhou et al.

(10) Patent No.: US 10,161,223 B2
(45) Date of Patent: Dec. 25, 2018

(54) USE OF SUPERABSORBENT POLYMERS FOR PRESSURE CONTROL AND DIVERSION APPLICATIONS

(71) Applicants: Jia Zhou, Cypress, TX (US); Harold Dean Brannon, Magnolia, TX (US); Paul S. Carman, Spring, TX (US); Leiming Li, Sugar Land, TX (US); Thomas Ray Starks, Spring, TX (US); D. V. Satyanarayana Gupta, The Woodlands, TX (US); Harold G. Hudson, The Woodlands, TX (US); Scott G. Nelson, Cypress, TX (US)

(72) Inventors: Jia Zhou, Cypress, TX (US); Harold Dean Brannon, Magnolia, TX (US); Paul S. Carman, Spring, TX (US); Leiming Li, Sugar Land, TX (US); Thomas Ray Starks, Spring, TX (US); D. V. Satyanarayana Gupta, The Woodlands, TX (US); Harold G. Hudson, The Woodlands, TX (US); Scott G. Nelson, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 238 days.

(21) Appl. No.: 15/084,598

(22) Filed: Mar. 30, 2016

(65) Prior Publication Data
US 2016/0289541 A1 Oct. 6, 2016

Related U.S. Application Data

(60) Provisional application No. 62/140,105, filed on Mar. 30, 2015.

(51) Int. Cl.
| | | |
|---|---|---|
| E21B 37/06 | (2006.01) |
| C09K 8/52 | (2006.01) |
| E21B 33/134 | (2006.01) |
| C09K 8/62 | (2006.01) |
| C09K 8/70 | (2006.01) |
| C09K 8/80 | (2006.01) |
| E21B 43/26 | (2006.01) |
| E21B 43/267 | (2006.01) |
| C09K 8/76 | (2006.01) |
| E21B 33/138 | (2006.01) |
| C09K 8/575 | (2006.01) |
| C09K 8/68 | (2006.01) |
| E21B 43/04 | (2006.01) |
| C09K 8/035 | (2006.01) |
| C09K 8/12 | (2006.01) |
| C09K 8/34 | (2006.01) |
| E21B 21/00 | (2006.01) |

(52) U.S. Cl.
CPC ............. *E21B 37/06* (2013.01); *C09K 8/035* (2013.01); *C09K 8/12* (2013.01); *C09K 8/34* (2013.01); *C09K 8/52* (2013.01); *C09K 8/5756* (2013.01); *C09K 8/62* (2013.01); *C09K 8/68* (2013.01); *C09K 8/685* (2013.01); *C09K 8/70* (2013.01); *C09K 8/703* (2013.01); *C09K 8/706* (2013.01); *C09K 8/76* (2013.01); *C09K 8/80* (2013.01); *E21B 21/00* (2013.01); *E21B 21/003* (2013.01); *E21B 33/134* (2013.01); *E21B 33/138* (2013.01); *E21B 43/04* (2013.01); *E21B 43/26* (2013.01); *E21B 43/267* (2013.01); *C09K 2208/26* (2013.01)

(58) Field of Classification Search
CPC ....................................................... E21B 43/26
See application file for complete search history.

(56) References Cited

U.S. PATENT DOCUMENTS

| | | |
|---|---|---|
| 3,425,971 A | 2/1969 | Gugliemelli et al. |
| 4,286,082 A | 8/1981 | Tsubakimoto et al. |
| 5,080,809 A * | 1/1992 | Stahl ............... C08F 226/06 166/270.1 |
| 5,086,841 A | 2/1992 | Reid et al. |
| 5,143,157 A | 9/1992 | Harms |
| 5,441,109 A | 8/1995 | Gupta et al. |
| 5,806,597 A | 9/1998 | Tjon-Joe-Pin et al. |
| 5,981,447 A | 11/1999 | Chang et al. |
| 6,164,380 A | 12/2000 | Davis |
| 6,169,058 B1 | 1/2001 | Le et al. |

(Continued)

OTHER PUBLICATIONS

"VaporFrac Fracturing Fluid", Retrieved from the Internet [https://www.bakerhughes.com/products-and-services/pressure-pumping/hydraulic-fracturing/fracturing-fluid-systems-proppant-technology/proppant-technology-vaporfrac], Baker Hughes; 10 pages.
Dragan, "Design and applications of interpenetrating polymer network hydrogels. A review", Chemical Engineering Journal 243 (2014), pp. 572-590.
International Search Report, International Application No. PCT/US2016/024868, dated Jul. 25, 2016, Korean Intellectual Property Office; International Search Report 4 Pages.
Written Opinion of the International Searching Authority, International Application No. PCT/US2016/024868, dated Jul. 25, 2016, Korean Intellectual Property Office; Written Opinion 6 Pages.

*Primary Examiner* — William D Hutton, Jr.
*Assistant Examiner* — Avi T Skaist
(74) *Attorney, Agent, or Firm* — Cantor Colburn LLP

(57) ABSTRACT

A method of hydraulically fracturing a subterranean formation penetrated by a wellbore comprises: providing a diverting fluid comprising a carrier fluid, a first superabsorbent polymer and a second superabsorbent polymer, the second superabsorbent polymer having a shape, or a composition, or a combination thereof different from that of the first superabsorbent polymer; injecting the diverting fluid into the subterranean formation; and injecting a fracturing fluid into the formation after injecting the diverting fluid. A viscosity modifying agent can be present in the diverting fluid. Superabsorbent polymers can also be used to develop a temporary filter cake at the formation face to reduce or eliminate the fluid leakoff out of the wellbore.

23 Claims, No Drawings

(56) References Cited

U.S. PATENT DOCUMENTS

| | | |
|---|---|---|
| 6,410,489 B1 | 6/2002 | Zhang et al. |
| 6,419,019 B1 | 7/2002 | Palmer et al. |
| 7,971,643 B2 | 7/2011 | Brannon et al. |
| 8,109,336 B2 | 2/2012 | Wheeler et al. |
| 8,839,859 B2 | 9/2014 | Ivan et al. |
| 2002/0007949 A1 | 1/2002 | Tolman et al. |
| 2002/0040812 A1 | 4/2002 | Heying |
| 2003/0236171 A1 | 12/2003 | Nguyen et al. |
| 2004/0040713 A1 | 3/2004 | Nguyen et al. |
| 2005/0080182 A1 | 4/2005 | Ahmed et al. |
| 2006/0086501 A1 | 4/2006 | Creel et al. |
| 2008/0085843 A1 | 4/2008 | Wang et al. |
| 2009/0082228 A1 | 3/2009 | Parris et al. |
| 2009/0095324 A1 | 4/2009 | Crowther et al. |
| 2009/0221453 A1 | 9/2009 | Mukhopadhyay et al. |
| 2010/0089581 A1 | 4/2010 | Nguyen et al. |
| 2010/0099781 A1 | 4/2010 | Tian et al. |
| 2010/0126735 A1 | 5/2010 | Allison et al. |
| 2011/0253454 A1 | 10/2011 | Freeman |
| 2012/0252264 A1 | 10/2012 | Zraik |
| 2012/0285692 A1* | 11/2012 | Potapenko ............ E21B 21/003 166/308.1 |
| 2013/0056213 A1 | 3/2013 | Medvedev et al. |
| 2013/0065765 A1* | 3/2013 | Selifonov ................ C08F 8/14 504/361 |
| 2013/0233545 A1 | 9/2013 | Mahoney et al. |
| 2013/0248191 A1 | 9/2013 | Nguyen |
| 2014/0000896 A1 | 1/2014 | Wang et al. |
| 2014/0000897 A1 | 1/2014 | Wang et al. |
| 2014/0024561 A1* | 1/2014 | Reddy ..................... C08J 3/245 507/117 |
| 2014/0158355 A1 | 6/2014 | Wuthrich et al. |
| 2014/0251610 A1 | 9/2014 | Brannon et al. |
| 2014/0332213 A1 | 11/2014 | Zhou |
| 2014/0332214 A1 | 11/2014 | Zhou et al. |
| 2016/0289530 A1 | 10/2016 | Nelson |
| 2016/0289541 A1 | 10/2016 | Zhou et al. |
| 2016/0289547 A1 | 10/2016 | Gupta et al. |
| 2016/0290104 A1 | 10/2016 | Nelson et al. |

\* cited by examiner

1

USE OF SUPERABSORBENT POLYMERS FOR PRESSURE CONTROL AND DIVERSION APPLICATIONS

CROSS REFERENCE TO RELATED APPLICATION

This application claims the benefit of U.S. patent application Ser. No. 62/140,105, filed Mar. 30, 2015, which is incorporated by reference in its entirety herein.

BACKGROUND

The disclosure relates to the use of superabsorbent polymers for pressure control and diversion applications.

Hydraulic fracturing is a stimulation process for creating high-conductivity communication with a large area of a subterranean formation. The process increases the effective wellbore area within the formation so that entrapped oil or gas production can be accelerated. The efficiency of the process is often measured by the total amount of contacted surface area that results from the stimulation treatment.

During hydraulic fracturing, a fracturing fluid is pumped at pressures exceeding the fracture pressure of the targeted reservoir rock in order to create or enlarge fractures within the subterranean formation penetrated by the wellbore. Once the fracture is initiated, subsequent stages of fluid containing chemical agents, as well as proppants, are pumped into the created fracture. The fracture generally continues to grow during pumping and the proppants remain in the fracture in the form of a permeable pack that serves to prop the fracture open. Once the treatment is completed, the fracture closes onto the proppants. The proppants keep the created fracture open, providing a highly conductive pathway for hydrocarbons and/or other formation fluids to flow into the wellbore.

To increase the productivity of hydrocarbons, it is desirable to increase the fracture area and the fracture complexity. However, during a hydraulic fracturing operation, fracturing fluids tend to flow to fractures or high permeable zones, affecting the total fracture area and the fracture complexity. Accordingly it may be desirable to add a diverting agent toward the end of an operation treating a section of a subterranean formation such that the agent will then slow or stop the flow of further treatment fluid into that area, thus diverting later-injected fluid to other areas of interest. Despite all the advances in the art, there is a continuing need for an improved method of diverting fluids during hydraulic fracturing operations.

In addition, high permeability formations, fractures, or depleted reservoir can also have excessive fluid leakoff rates. Excessive fluid leakoff can lead to a loss of wellbore pressure, which can affect coiled tubing operations which relies on sufficient wellbore pressure to maintain circulation to the surface while performing ongoing treatments within the well. Accordingly, there is also a need for methods that are effective to reduce or eliminate fluid leakoff during a coiled tubing operation.

BRIEF DESCRIPTION

In an embodiment, a method of hydraulically fracturing a subterranean formation penetrated by a wellbore comprises: providing a diverting fluid comprising a carrier fluid, a first superabsorbent polymer and a second superabsorbent polymer, the second superabsorbent polymer having a shape, or a composition, or a combination thereof different from that of the first sup erabsorbent polymer; injecting the diverting fluid into the subterranean formation; and injecting a fracturing fluid into the formation after injecting the diverting fluid, wherein the flow of the fracturing fluid is impeded by the first and second superabsorbent polymers, and the first and second superabsorbent polymers are selected such that the diverting fluid comprising both the first and second superabsorbent polymers has an improved diversion efficiency as compared to a reference diverting fluid comprising the first superabsorbent polymer or the second superabsorbent polymer but not both.

In another embodiment, a method of hydraulically fracturing a subterranean formation penetrated by a wellbore comprises: providing a diverting fluid comprising a carrier fluid, a superabsorbent polymer, and a viscosity modifying agent effective to increase the viscosity of the diverting fluid at a shear rate of $100S^{-1}$; injecting the diverting fluid into the subterranean formation; and injecting a fracturing fluid into the subterranean formation after injecting the diverting fluid; wherein the flow of the fracturing fluid is impeded by the superabsorbent polymer, and the diverting fluid has an improved diversion efficiency as compared to a reference diverting fluid comprising the carrier fluid, the superabsorbent polymer but not the viscosity modifying agent.

In still another embodiment, a method of treating a wellbore comprises circulating a filter cake-forming composition in the wellbore, the filter cake-forming composition comprising a superabsorbent polymer and a carrier fluid; forming a filter cake at a formation face to reduce or eliminate fluid leakoff; performing a well operation; and breaking the superabsorbent polymer and removing the filter cake.

DETAILED DESCRIPTION

The inventors have found that a diverting fluid can have improved diversion efficiencies when the diverting fluid contains at least two superabsorbent polymers having different shapes, or different compositions, or both. The inventors have also found that the fluid diversion efficiencies can be further improved by increasing the viscosity of a diverting fluid at low shear conditions. In particular, the viscosity of a diverting fluid comprising superabsorbent polymer particles can be increased by crosslinking the superabsorbent polymer at particles' surface or by adding a low dose of certain viscosity modifying polymers to the diverting fluid.

It has also been found that superabsorbent polymers can be used to develop a temporary filter cake at the formation face to reduce or eliminate the fluid lea.koff out of the wellbore. This would enable a coiled tubing operation to maintain circulation to the surface while performing ongoing treatments in the well. The superabsorbent polymers can later be broken with breakers in order to return the wellbore to its original condition.

As used herein, a superabsorbent polymer (SAP) is a crosslinked, neutral, neutralized or partially neutralized polymer that is capable of absorbing large amounts of aqueous liquids, such as water, brine, acid, or base, with swelling and the formation of a gel or viscous material, and that retains the absorbed fluid under a certain pressure or temperature. The swelling of the superabsorbent polymer can be triggered by formation conditions such as temperature and pH after fluids containing the superabsorbent polymers penetrate far field. Once the superabsorbent polymers swell, they form a temporary plug, which diverts the flow of the fluids elsewhere.

The SAP comprises a hydrophilic network that retains large amounts of aqueous liquid relative to the weight of the SAP (e.g., in a dry state, the SAP absorbs and retains a weight amount of water equal to or greater than its own weight). The SAPs can be a variety of synthetic organic polymers that react with or absorb water and swell when contacted with an aqueous fluid. Non-limiting examples of such SAPs are poly(hydroxyC$_{1-8}$ alkyl (meth)acrylate)s such as (2-hydroxyethyl acrylate), poly(meth)acrylamide, poly (vinyl pyrrolidine), poly(vinyl acetate), starch-acrylonitrile grafted copolymer of polyacrylonitrile, carboxymethyl cellulose, crosslinked polyacrylates, sulfonated polystyrene, hydrolyzed polyacrylamide, polyvinyl alcohol, polyethylene oxide, polyvinyl pyrrolidone, polyacrylonitrile, and the like. The foregoing are inclusive of copolymers, for example copolymers of (meth)acrylamide with maleic anhydride, vinyl acetate, ethylene oxide, ethylene glycol, or acrylonitrile, or a combination comprising at least one of the foregoing. A combination of different polymers can be used.

The SAPs are polymerized from nonionic, anionic, cationic monomers, or a combination comprising at least one of the foregoing. Polymerization can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for preparing the preformed synthetic polymers include (meth)acrylamide, alkyl-substituted (meth)acrylamides, aminoalkyl-substituted (meth)acrylamides, alkyliminoalkyl-substituted (meth)acrylamides, vinyl alcohol, vinyl acetate, allyl alcohol, C$_{1-8}$ alkyl (meth)acrylates, hydroxyC$_{1-8}$ alkyl (meth)acrylates such as hydroxyethyl (meth)acrylate, N-vinylformamide, N-vinylacetamide, and (meth)acrylonitrile. As used herein, "poly ((meth)acrylamide)s" includes polymer comprising units derived from (meth)acrylamide, alkyl-substituted (meth) acrylamides such as N-C$_{1-8}$ alkyl (meth)acrylamides and N,N-di(C$_{1-8}$ alkyl) (meth)acrylamides, aminoalkyl-substituted (meth)acrylamides such as N,N-di(amino(C$_{1-8}$ alkyl))-substituted (meth)acrylamides, and (N,N-dialkylamino) alkyl-substituted (meth)acrylamides such as (N,N-di(C$_{1-8}$ alkyl)amino)(C$_{1-8}$ alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or a combination comprising at least one of the foregoing. In an embodiment, the poly((meth)acrylamide) is a copolymer of methacrylamide with maleic anhydride, vinyl acetate, ethylene oxide, ethylene glycol, or acrylonitrile, or a combination comprising at least one of the foregoing.

Examples of anionic monomers include ethylenically unsaturated anionic monomers having acidic groups or their salts, for example, a carboxylic group, a sulfonic group, a phosphonic group, a salt thereof, the corresponding anhydride or acyl halide, or a combination comprising at least one of the foregoing acidic groups. For example, the anionic monomer can be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, a salt thereof, or a combination comprising at least one of the foregoing.

Examples of cationic monomers include (N,N-di(C$_{1-8}$ alkylamino)(C$_{1-8}$ alkyl) (meth)acrylates (e.g., N,N-dimethylaminoethyl acrylate and N,N-dimethylaminoethyl methacrylate), (wherein the amino group is quaternized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di(C$_{1-8}$ alkyl)amino)C$_{1-8}$ alkyl acrylamide, and the quaternary forms thereof such as acrylamidopropyl trimethyl ammonium chloride.

The superabsorbent polymer can contain both cationic substituents and anionic substituents. The cationic substituents and anionic substituents occur in various stoichiometric proportions, for example, a ratio of about 1:1, or one monomer can be present in a greater stoichiometric amount than the other monomer. Representative amphoteric polymers include terpolymers of nonionic monomers, anionic monomers and cationic monomers.

In an embodiment, the superabsorbent polymer includes a repeating unit derived from an acrylate, an acrylic acid or a salt thereof, an acrylamide, a vinylpyrrolidone, a vinyl ester (e.g., a vinyl acetate), a vinyl alcohol, a 2-acrylamide-2-methylpropanesulfonic acid, a derivative thereof, or a combination thereof.

The superabsorbent polymer includes a plurality of crosslinks among the polymer chains of the superabsorbent polymer. According to an embodiment, the crosslinks are covalent and result from crosslinking within the superabsorbent polymer. In an embodiment, the crosslinker is an ethylenically unsaturated monomer that contains, e.g., two sites of ethylenic unsaturation (i.e., two ethylenically unsaturated double bonds), an ethylenically unsaturated double bond and a functional group that is reactive toward a functional group (e.g., an amide group) of the polymer chains of the superabsorbent polymer, or several functional groups that are reactive toward functional groups of the polymer chains of the superabsorbent polymer. In an embodiment, the degree of crosslinking in the superabsorbent polymer herein is selected to control the amount of swelling (i.e., fluid absorption or volume expansion) of the superabsorbent polymer.

Exemplary crosslinkers include a di(meth)acrylamide of a diamine such as a diacrylamide of piperazine, a C$_{1-8}$ alkylene bisacrylamide such as methylene bisacrylamide and ethylene bisacrylamide, an N-methylol compounds of an unsaturated amide such as N-methylol methacrylamide or N-methylol acrylamide, a (meth)acrylate esters of a di-, tri-, or tetrahydroxy compound such as ethylene glycol diacrylate, poly(ethyleneglycol) di(meth)acrylate, trimethylopropane tri(meth)acrylate, ethoxylated trimethylol tri(meth) acrylate, glycerol tri(meth)acrylate), ethoxylated glycerol tri(meth)acrylate, pentaerythritol tetra(meth)acrylate, ethoxylated pentaerythritol tetra(meth)acrylate, butanediol di(meth)acrylate), a divinyl or diallyl compound such as allyl (meth)acrylate, alkoxylated allyl(meth)acrylate, diallylamide of 2,2'-azobis(isobutyric acid), triallyl cyanurate, triallyl isocyanurate, maleic acid diallyl ester, polyallyl esters, tetraallyloxyethane, triallylamine, and tetraallylethylene diamine, a diols polyol, hydroxyallyl or acrylate compounds, and allyl esters of phosphoric acid or phosphorous acid. Specifically mentioned are water soluble diacrylates such as poly(ethylene glycol) diacrylate (e.g., PEG 200 diacrylate or PEG 400 diacrylate). A combination comprising any of the above-described crosslinkers can also be used. Additional crosslinks are described in US 2014/0332213, US 2014/0332214, and US 2015/0096751.

Non-limiting examples of superabsorbent polymers include poly 2-hydroxyethyl acrylate, polyalkyl acrylate, polyacrylamide, poly methacrylamide, poly vinylpyrrolidone, poly vinyl acetate, polyacrylic acid, polyacrylic acid salt, or copolymers thereof. As a specific example, the superabsorbent polymer is polyacrylamide having crosslinks that are polyethylene glycol diacrylate. As another specific example, the superabsorbent polymer is a copolymer of acrylamide with, for example, maleic anhydride, vinyl acetate, ethylene oxide, ethylene glycol, acrylonitrile, or a combination thereof. Another specific example of superabsorbent polymer is polyacrylamide having crosslinks that are polyethylene glycol diacrylate. In some embodiments, the superabsorbent polymer is polyacrylic acid homopolymer or copolymer, wherein the crosslinks are vinyl ester oligomer. In an embodiment, the superabsorbent polymer is a copolymer of acrylic acid and sodium acrylate with crosslinks derived from polyethylene glycol diacrylate.

The size of the superabsorbent polymer is from 10 µm to 200,000 µm, specifically 50 µm to 10,000 µm, and more specifically 50 µm to 1,000 µm. As used herein, "size" refers to the largest linear dimension, e.g., a diameter in a spherical particle. The superabsorbent polymers can be in a number of formats, including a particle (e.g., a powder), fiber, strand, braid, and the like, or a combination thereof. Particles of the SAP are any shape including spherical, angular, and polyhedral.

It has been found when superabsorbent polymers having different shapes are used together in a diverting fluid, the diversion efficiency of the fluid can be improved. In an embodiment, the diverting fluid contains a first superabsorbent polymer and a second superabsorbent polymer, wherein the first superabsorbent polymer is a particulate material and the second superabsorbent polymer is a fiber. As used herein, a fiber refers to a superabsorbent polymer having an aspect ratio of greater than or equal to 3 and a particulate material refers to a superabsorbent polymer having an aspect ratio of less than 3. Without wishing to be bound by theory, it is believed that using superabsorbent polymers having a particulate form and a fiber form can reduce the permeability between the superabsorbent materials thus increasing their fluid diversion efficiencies.

Diverting fluids can also include two superabsorbent polymers having different compositions. In an embodiment, diverting fluids contain a first superabsorbent polymer and a second superabsorbent polymer, where the second superabsorbent polymer has a slower swelling rate and is more salt tolerant as compared to the first superabsorbent polymer. As a specific example, the first superabsorbent polymer comprises a crosslinked copolymer of an acrylic acid and an acrylate salt and the second superabsorbent polymer comprises a crosslinked polyvinyl alcohol homopolymer or copolymer. It is believed that a crosslinked polyvinyl alcohol homopolymer or copolymer can have a slower swelling rate as compared to a crosslinked copolymer of a copolymer of acrylic acid an acrylate salt.

As another specific example, the first superabsorbent polymer comprises an uncoated superabsorbent polymer and the second superabsorbent polymer comprises a coated superabsorbent polymer. Without wishing to be bound by theory, it is believed that coated superabsorbent polymer can have a slower swelling rate than the uncoated superabsorbent polymer.

The coating for the coated superabsorbent polymer includes an organic compound, a thermoset or thermoplastic polymer, or a wax. In an embodiment, the coating is an organic compound that includes epoxy, phenolic, polyurethane, polycarbodiimide, polyamide, polyamide imide, furan resins, or a combination thereof. The phenolic polymer is, e.g., a phenol formaldehyde resin obtained by the reaction of phenol, bisphenol, or derivatives thereof with formaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting polymer such as resole or a thermoplastic resin that is rendered thermosetting by a hardening agent), polyester resin, polyurethanes, epoxy-modified phenolic polymers, and derivatives thereof. Wax is specifically mentioned.

Optionally the coating can be cured depending on the specific coating material used. Suitable curing agent for the coating is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof. Any methods known in the art to coat solid particles or fibers can be used.

In other embodiments, the diverting fluid comprises a first superabsorbent polymer and a second superabsorbent polymer where the first superabsorbent comprises an interpenetrated network and the second superabsorbent polymer is free of any interpenetrated network.

As used herein, an interpenetrated network refers to a network comprising a superabsorbent polymer having negative charges and a cationic or nonionic superabsorbent polymer bonded to the surface of the superabsorbent polymer having negative charges. Without wishing to be bound by theory, it is believed that an interpenetrated network is created by forces such as Van der Waals forces between the negatively charged and the cationic or nonionic superabsorbent polymers. Exemplary cationic superabsorbent polymers include cationic acrylamide copolymers, Exemplary nonionic superabsorbent polymers include polyvinyl alcohol, polyvinyl acetate, or a combination comprising at least one of the foregoing. This is similar to the formation of wormlike micles with surfactants of opposite charges. Further examples of interpenetrating polymer network hydrogels are given in the review article "Design and applications of interpenetrating polymer network hydrogels. A review" by E. S. Dragan in Chemical Engineering Journal 243 (2014) pages 572-590.

The weight ratio of the first superabsorbent polymer relative to the second superabsorbent polymer is about 1:50 to about 50:1, specifically about 1:20 to about 20:1, more specifically about 1:10 to about 10:1, even more specifically about 1:5 to about 5:1. A diverting fluid can comprise about 1 to about 200 pounds, specifically about 2 to about 100 pounds, more specifically about 20 to about 80 pounds of the combined first and second superabsorbent polymers per one thousand gallons of the diversion fluid.

Energized fluids or emulsion fluids can also be used to reduce the permeability between the superabsorbent polymers thus improving their diversion efficiencies. A treatment fluid is considered "energized" when a compressible sometimes soluble gas phase is introduced into the treatment fluid. Examples of the gas phase are air, nitrogen, carbon dioxide, natural gas and the like, or mixtures thereof or a combination comprising at least one of the foregoing.

The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts and alkyl amido amine quaternary ammonium salts. Foam system is mainly used in fracturing low pressure or water sensitive formations.

In an energized diverting fluid, the superabsorbent polymer can be present in a mass concentration from 15 pound of SAP per one thousand gallons of the diverting fluid (ppt) to 200 ppt, specifically 20 ppt to 100 ppt, and more specifically 30 ppt to 80 ppt.

The inventors have also found that increasing the viscosity of diverting fluids at low shear conditions increase their diversion efficiencies. Accordingly, a method of hydraulically fracturing a subterranean formation penetrated by a wellbore comprises: providing a diverting fluid comprising a carrier fluid, a superabsorbent polymer, and a viscosity modifying agent effective to increase the viscosity of the diverting fluid at a shear rate of $100S^{-1}$; injecting the diverting fluid into the subterranean formation; injecting a fracturing fluid into the formation after injecting the diverting fluid, wherein the flow of the fracturing fluid is impeded by the superabsorbent polymer, and the diverting fluid has an improved diversion efficiency as compared to a reference diverting fluid comprising the carrier fluid, the superabsorbent polymer but not the viscosity modifying agent. In an embodiment, the diverting fluid has a viscosity of about 1 to about 2000 or about 100 to about 1500 or about 200 to 1500 at $100S^{-1}$ after being injected into the subterranean formation.

The viscosity modifying agent includes one or more of the following: starch-acrylonitrile grafted polymer hydrolysate; carboxymethyl cellulose; xanthan; diutan; sulfonated polystyrene; hydrolyzed polyacrylamide; polyvinyl alcohol; polyethylene oxide; polyvinyl pyrrolidone; or konjac glucomannan.

The diverting fluids can comprise about 15 to about 200_ppt to about 20 to about 100 ppt of the superabsorbent polymer and about 1 to about 40 ppt or about 4 ppt to about 20 ppt of the viscosity modifying agent.

The viscosity modifying agent can also be a crosslinker that is effective to crosslink superabsorbent particulates or fibers at their surface. A surface crosslink occurs external to the interior of the superabsorbent polymer. The surface crosslinks, e.g., result from addition of a surface crosslinker to the superabsorbent polymer particulates or fibers and heat-treatment. The surface crosslinks increase the crosslink density of the SAP near its surface with respect to the crosslinking density of the interior of the SAP. Some surface crosslinkers have a functional group that is reactive toward a group of the polymer chains of the SAP, e.g., an acid or amide group. The surface crosslinker are one of the previously mentioned crosslinkers and include a functional group such as an alcohol, amine, aldehyde, or carboxylate group. In an embodiment, surface crosslinkers have multiple different functional groups such as polyols, polyamines, polyaminoalcohols, and alkylene carbonates. In some embodiments, the viscosity modifying agent is a crosslinking agent comprising Zr such as zirconate, Cr such as chromate, Ti such as titanate, or Al such as aluminate, or a combination comprising at least one of the foregoing.

The carrier fluid include an aqueous carrier such as water, brine, an acid such as a mineral acid or an organic acid, a base, or a combination comprising at least one of the foregoing.

The diverting fluids as disclosed herein can optionally further comprise coated or uncoated proppant. The proppant particles include a ceramic, sand, a mineral, a naturally occurring proppant such as a nutshell, a seed shell, or a wood material, gravel, glass, resinous particles, polymeric particles, or a combination thereof. In an embodiment, the proppant particles are selected depending on the particular application of the hydraulic fracturing composition. Examples of the ceramic include an oxide-based ceramic, nitride-based ceramic, carbide-based ceramic, boride-based ceramic, silicide-based ceramic, or a combination thereof In an embodiment, the oxide-based ceramic is silica ($SiO_2$), titanium dioxide ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like. These proppant particles are relatively lightweight and/or substantially neutrally buoyant proppant particulates, which have been described in U.S. Pat. No. 6,364,018. By "relatively lightweight" it is meant that a particulate has a density that is substantially less than a conventional proppant particulate material employed in hydraulic fracturing operations, e.g., sand or having a density similar to these materials. Relatively lightweight and substantially neutrally buoyant proppant particles are commercially available as LITEPROP from Baker Hughes Inc.

In an embodiment, the proppant particles are coated as discussed herein with regard to superabsorbent polymers. The materials to coat the proppant can be the same as the materials that coat the superabsorbent polymer. Any suitable coating method known in the art can be used.

The proppant particles are present in an amount effective to increase the diversion efficiencies of the diverting fluids.

In a particular embodiment, the proppant particles are present in a mass concentration of about 0.01 pounds per gallon of the diverting fluids (ppg) to about 10 ppg, specifically about 0.1 ppg to about 5 ppg, The diverting fluid can further include a breaker in some embodiments. The breaker contacts the superabsorbent polymer to break the superabsorbent polymer. In an embodiment, the breaker contacts the superabsorbent polymer and breaks a bond in the backbone of the polymer chains of the superabsorbent polymer, a bond in the crosslinker, a bond between the crosslinker and a polymer chain of the superabsorbent, or a combination thereof. That is, breaking the superabsorbent polymer includes disintegrating, decomposing, or dissociating the superabsorbent polymer such as by breaking bonds in the backbone of the superabsorbent polymer, breaking crosslinks among chains of the superabsorbent polymer, changing a geometrical conformation of the superabsorbent polymer, or a combination thereof. In some embodiments, the breaker breaks the superabsorbent polymer to form a decomposed polymer such as a plurality of fragments that have a lower molecular weight than the superabsorbent polymer.

The breaker includes an oxidizer such as a peroxide, a persulfate, a perphosphate, a perborate, a percarbonate, a persilicate, an oxyacid of a halogen, an oxyanion of halogen, a peracid, a derivative thereof, or a combination thereof.

The breaker is optionally encapsulated in an encapsulating material to prevent the breaker from contacting the superabsorbent. The encapsulating material is configured to release the breaker in response to the breaking condition. The breaker is a solid or liquid. As a solid, the breaker is, e.g., a crystalline or granular material. In an embodiment, the solid is encapsulated or provided with a coating to delay its release or contact with the superabsorbent polymer. Encapsulating materials are the same or different as the coating material noted above with regard to the proppant particles. Methods of disposing the encapsulating material on the breaker are the same or different as for disposing the coating on the proppant particles or superabsorbent polymers. In an embodiment, a liquid breaker is dissolved in an aqueous solution or another suitable solvent.

The breaker can be present in the diverting fluid in a mass concentration from 0.1 ppt to 20 ppt, specifically 0.2 ppt to 15 ppt, and more specifically, 0.25 ppt to 10 ppt, based on the total volume of the fluid. Additional information about the breakers can be found in U.S. 2014/03322123 and U.S. 2014/0332214.

The diverting fluids can be used in fracturing applications. In an embodiment, a fracturing fluid is injected into a subterranean formation at a pressure sufficient to create or enlarge a fracture before the diverting fluid is introduced into the subterranean. Any fracturing fluids known in the art can be used. The diverting fluids can also be used in diverting the water flooding for mature oilfields. For example, the superabsorbent polymers can bridge off in intersecting fractures diverting the fluid flow elsewhere. The diversion fluid may provide more created fracture area and complexity with a lesser fluid volume.

Superabsorbent polymers or combination of superabsorbent polymers as disclosed herein can also be used to develop a temporary filter cake at the formation face to reduce or eliminate the fluid leakoff out of the wellbore. Accordingly a method of treating a wellbore comprises: circulating a filter cake-forming composition in the wellbore, the filter cake-forming composition comprising a superabsorbent polymer and a carrier fluid; forming a filter cake at a formation face to reduce or eliminate fluid leakoff; performing a well operation; and breaking the superabsorbent polymer and removing the filter cake. The filter cake-forming composition comprises about 0.1 ppt to about 100 ppt, specifically about 1 ppt to about 50 ppt, more specifically about 5 ppt to about 30 ppt of the superabsorbent polymer or a combination of at least two different superabsorbent polymers as disclosed herein in the context of diverting fluids. The well operation is not particularly limited and can include hydraulic fracturing, acidizing, or well workover. In an embodiment, the superabsorbent polymers are effect to prevent or reduce fluid leakoff thus are effective to maintain wellbore pressures to allow a coiled tubing operation to maintain circulation to the surface while performing ongoing treatments in the well.

Set forth below are various embodiments of the disclosure.

Embodiment 1A method of hydraulically fracturing a subterranean formation penetrated by a wellbore, the method comprising: providing a diverting fluid comprising a carrier fluid, a first superabsorbent polymer and a second superabsorbent polymer, the second superabsorbent polymer having a shape, or a composition, or a combination thereof different from that of the first superabsorbent polymer; and injecting the diverting fluid into the subterranean formation; injecting a fracturing fluid into the formation after injecting the diverting fluid, wherein the flow of the fracturing fluid is impeded by the first and second superabsorbent polymers, and the first and second superabsorbent polymers are selected such that the diverting fluid comprising both the first and second superabsorbent polymers has an improved diversion efficiency as compared to a reference diverting fluid comprising the first superabsorbent polymer or the second superabsorbent polymer but not both.

Embodiment 2The method Embodiment 1, wherein the second superabsorbent polymer has a slower swelling rate and is more salt tolerant as compared to the first superabsorbent polymer.

Embodiment 3The method of Embodiment 1 or Embodiment 2, wherein: the first superabsorbent polymer is an uncoated superabsorbent polymer; and the second superabsorbent polymer is a coated superabsorbent polymer.

Embodiment 4The method of any one of Embodiments 1 to 3, wherein the first superabsorbent polymer comprises an interpenetrated network; and the second superabsorbent polymer is free of an interpenetrated network.

Embodiment 5The method of any one of Embodiments 1 to 3, wherein: the first superabsorbent polymer is a crosslinked copolymer of an acrylic acid and an acrylate salt; and the second superabsorbent polymer is a crosslinked polyvinyl alcohol homopolymer or copolymer.

Embodiment 6The method of any one of Embodiments 1 to 5, wherein the first superabsorbent polymer is a particulate material and the second superabsorbent polymer is a fiber.

Embodiment 7The method of any one of Embodiments 1 to 6, wherein the diverting fluid is a foamed fluid further comprising a gas constituent.

Embodiment 8The method of any one of Embodiments 1 to 7, wherein the weight ratio of the first superabsorbent polymer relative to the second superabsorbent polymer is about 1:10 to about 10:1.

Embodiment 9The method of any one of Embodiments 1 to 8, further comprising breaking the first superabsorbent polymer, the second superabsorbent polymer or both.

Embodiment 10The method of any one of Embodiments 1 to 9, further comprising injecting a first fracturing fluid into the subterranean formation at a pressure sufficient to create or enlarge a fracture before introducing the diverting fluid.

Embodiment 11A method of hydraulically fracturing a subterranean formation penetrated by a wellbore, the method comprising: providing a diverting fluid comprising a carrier fluid, a superabsorbent polymer, and a viscosity modifying agent effective to increase the viscosity of the diverting fluid at a shear rate of $100S^{-1}$; injecting the diverting fluid into the subterranean formation; injecting a fracturing fluid into the formation after injecting the diverting fluid, wherein the flow of the fracturing fluid is impeded by the superabsorbent polymer, and the diverting fluid has an improved diversion efficiency as compared to a reference diverting fluid comprising the carrier fluid, the superabsorbent polymer but not the viscosity modifying agent.

Embodiment 12The method of Embodiment 11, wherein the diverting fluid comprises about 15 pounds to about 200 pounds of the superabsorbent polymer and about 1 pounds to about 40 pounds of the viscosity modifying agent per one thousand gallons of the diverting fluid.

Embodiment 13The method of Embodiment 11 or Embodiment 12, wherein the viscosity modifying agent is one or more of the following: starch-acrylonitrile grafted polymer hydrolysate; carboxymethyl cellulose; xanthan; diutan; sulfonated polystyrene; hydrolyzed polyacrylamide; polyvinyl alcohol; polyethylene oxide; polyvinyl pyrrolidone; or konjac glucomannan.

Embodiment 14The method of any one of Embodiments 11 to 13, wherein the viscosity modifying agent is a crosslinker comprising Zr, Cr, Ti, or Al, or a combination comprising at least one of the foregoing.

Embodiment 15The method of any one of Embodiments 11 to 13, wherein the diverting fluid has a viscosity of about 1 to about 2000 after being injected into the subterranean formation.

Embodiment 16The method of any one of Embodiments 11 to 15, further comprising injecting a first fracturing fluid into the subterranean formation at a pressure sufficient to create or enlarge a fracture before introducing the diverting fluid.

Embodiment 17A method of treating a wellbore, the method comprising: circulating a filter cake-forming composition in the wellbore, the filter cake-forming composition comprising a superabsorbent polymer and a carrier fluid; forming a filter cake at a formation face to reduce or eliminate fluid leakoff; performing a well operation; and breaking the superabsorbent polymer and removing the filter cake.

Embodiment 18The method of Embodiment 17, wherein the well operation is a coil tubing treatment.

Embodiment 19The method of Embodiment 17 or Embodiment 18, wellbore operation comprise hydraulic fracturing, acidizing, or well workover.

Embodiment 20The method of any one of Embodiments 17 to 19, wherein the diverting fluid comprises about 1 pound to about 100 pounds of the superabsorbent polymer per one thousand gallons of the diverting fluid.

All ranges disclosed herein are inclusive of the endpoints, and the endpoints are independently combinable with each other. "Or" means "and/or." As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of hydraulically fracturing a subterranean formation penetrated by a wellbore, the method comprising:
   providing a diverting fluid comprising a carrier fluid, a first superabsorbent polymer and a second superabsorbent polymer, the second superabsorbent polymer having a shape, or a composition, or a combination thereof different from that of the first superabsorbent polymer;
   injecting the diverting fluid into the subterranean formation; and
   injecting a fracturing fluid into the formation after injecting the diverting fluid,
   wherein the flow of the fracturing fluid is impeded by the first and second superabsorbent polymers,
   the diverting fluid comprises about 1 to about 200 pounds of the combined first and second superabsorbent polymers per one thousand gallons of the diversion fluid, the weight ratio of the first superabsorbent polymer relative to the second superabsorbent polymer is about 1:10 to about 10:1, and one or more of the following conditions apply:
   (i) the first superabsorbent polymer is an uncoated superabsorbent polymer, and the second superabsorbent polymer is a coated superabsorbent polymer; or
   (ii) the first superabsorbent polymer comprises an interpenetrated network, and the second superabsorbent polymer is free of an interpenetrated network.

2. The method of claim 1, wherein:
   the first superabsorbent polymer is an uncoated superabsorbent polymer; and
   the second superabsorbent polymer is a coated superabsorbent polymer.

3. The method of claim 1, wherein
   the first superabsorbent polymer comprises an interpenetrated network; and
   the second superabsorbent polymer is free of an interpenetrated network.

4. The method of claim 1, wherein:
   the first superabsorbent polymer is a crosslinked copolymer of an acrylic acid and an acrylate salt; and
   the second superabsorbent polymer is a crosslinked polyvinyl alcohol homopolymer or copolymer.

5. A method of hydraulically fracturing a subterranean formation penetrated by a wellbore, the method comprising;
   providing a diverting fluid comprising a carrier fluid, a first superabsorbent polymer and a second superabsorbent polymer, the second superabsorbent polymer having a shape, or a composition, or a combination thereof different from that of the first superabsorbent polymer:
   injecting the diverting fluid into the subterranean formation; and injecting a fracturing fluid into the formation after injecting the diverting fluid, wherein the flow of the fracturing fluid is impeded by the first and second superabsorbent polymers the diverting fluid comprises about 1 to about 200 pounds of the combined first and second superabsorbent polymers per one thousand gallons of the diversion fluid, the weight ratio of the first superabsorbent polymer relative to the second superabsorbent polymer is about 1:10 to 10:1;

wherein the first superabsorbent polymer is a particulate material and the second superabsorbent polymer is a fiber, and at least one of the first superabsorbent polymer and the second superabsorbent polymer comprise a copolymer of acrylic acid and sodium acrylate with crosslinks derived from polyethylene glycol diacrylate.

6. The method of claim 1, wherein the diverting fluid is a foamed fluid further comprising a gas constituent.

7. The method of claim 1, wherein the weight ratio of the first superabsorbent polymer relative to the second superabsorbent polymer is about 1:5 to about 5:1.

8. The method of claim 1, further comprising breaking the first superabsorbent polymer, the second superabsorbent polymer or both.

9. The method of claim 1, further comprising injecting a first fracturing fluid into the subterranean formation at a pressure sufficient to create or enlarge a fracture before introducing the diverting fluid.

10. A method of hydraulically fracturing a subterranean formation penetrated by a wellbore, the method comprising:
    providing a diverting fluid comprising a carrier fluid, a superabsorbent polymer, and a viscosity modifying agent effective to increase the viscosity of the diverting fluid at a shear rate of $100S^{-1}$;
    injecting the diverting fluid into the subterranean formation;
    injecting a fracturing fluid into the formation after injecting the diverting fluid,
    wherein the superabsorbent polymer comprises a polyacrylamide having crosslinks derived from polyethylene glycol diacrylate, a polyacrylic acid homopolymer or copolymer having crosslinks of a vinyl ester oligomer, a copolymer of acrylic acid and sodium arylate with crosslinks derived from polyethylene glycol diacrylate, or a combination comprising at least one of the foregoing, and the flow of the fracturing fluid is impeded by the superabsorbent polymer.

11. The method of claim 10, wherein the diverting fluid comprises about 15 pounds to about 200 pounds of the superabsorbent polymer and about 1 pounds to about 40 pounds of the viscosity modifying agent per one thousand gallons of the diverting fluid.

12. The method of claim 10, wherein the viscosity modifying agent is one or more of the following: starch-acrylonitrile grafted polymer hydrolysate; carboxymethyl cellulose; xanthan; diutan; sulfonated polystyrene; hydrolyzed polyacrylamide; polyvinyl alcohol; polyethtylene oxide; polyvinyl pyrrolidone; or konjac glucomannan.

13. The method of claim 10, wherein the viscosity modifying agent is a crosslinker comprising Zr, Cr, Ti, or Al, or a combination comprising at least one of the foregoing.

14. The method of claim 10, further comprising injecting a first fracturing fluid into the subterranean formation at a pressure sufficient to create or enlarge a fracture before introducing the diverting fluid.

15. The method of claim 2, wherein the coated superabsorbent polymer has a coating that comprises epoxy, phenolic, polyurethane, polycarbodiimide, polyamide, polyamide imide, furan resins, wax, polyethylene, acrylonitrile-butadiene styrene, polystyrene, polyvinyl chloride, fluoroplastics, polysulfide, polypropylene, styrene acrylonitrile, nylon, phenylene oxide, or a combination thereof.

16. The method of claim 3, wherein the first superabsorbent polymer has a network comprising a superabsorbent polymer having negative charges and a cationic or nonionic superabsorbent polymer bonded to a surface of the superabsorbent polymer having negative charges.

17. The method of claim 1, wherein the diverting fluid comprises about 2 to about 100 pounds of the combined first and second superabsorbent polymers per one thousand gallons of the diversion fluid.

18. The method of claim 1, wherein the diverting fluid comprises about 30 to about 80 pounds of the combined first and second superabsorbent polymers per one thousand gallons of the diversion fluid.

19. The method of claim 1, wherein the first and second superabsorbent polymers independently comprise at least a repeating unit derived from an acrylate, an acrylic acid, a salt of an acrylic acid, an acrylamide, a vinylpyrrolidone, a vinyl ester, a vinyl alcohol, or a 2-acrylamide-2-methylpropanesulfonic acid, and each of the first and second superabsorbent polymers has crosslinks.

20. The method of claim 1, wherein the first superabsorbent polymer is a copolymer of acrylic acid and sodium acrylate with crosslinks derived from polyethylene glycol diacrylate.

21. The method of claim 1, wherein the diverting fluid further comprises about 0.01 to about 10 pounds of a proppant per gallon of the diverting fluid.

22. The method of claim 10, wherein the diverting fluid comprises about 20 pounds to about 100 pounds of the superabsorbent polymer and about 4 pounds to about 20 pounds of the viscosity modifying agent per one thousand gallons of the diverting fluid.

23. The method of claim 22, wherein the diverting fluid further comprises about 0.1 to about 5 pounds of a proppant per gallon of the diverting fluid.

* * * * *